Figure 1:
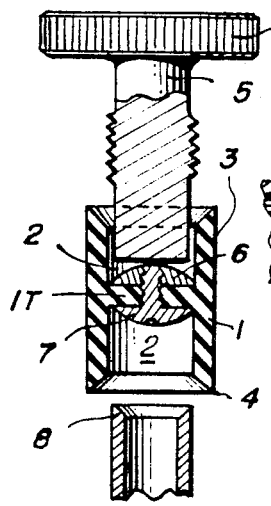

Aug. 23, 1966 J. D. LANGDON 3,267,950
ALTERNATING CHECK VALVE ARRANGEMENT
Filed March 11, 1963

INVENTOR
J. D. Langdon

United States Patent Office 3,267,950
Patented August 23, 1966

3,267,950
ALTERNATING CHECK VALVE ARRANGEMENT
Jesse D. Langdon, East Rockaway, N.Y.
(1000 Franklin Ave., Valley Stream, N.Y. 11580)
Filed Mar. 11, 1963, Ser. No. 264,390
6 Claims. (Cl. 137—112)

The invention lies in the manner and process of making and using an arrangement of elements comprising valve means slidably disposed for alternate seating against the terminal ends of oppositely disposed conduits for fluid pressure elements, the valve means formed by hollow sleeve means including transversely disposed seat means having opposite seat faces interrupting the hollow between opposite open ends of the sleeve, the terminal end of at least one of the conduits being slidably encompassed at all times by the wall of said sleeve, same forming annular skirt means projecting forwardly of the periphery of the opposite faces of said seat means and forming oppositely disposed cavities adapted to receive the terminal end of either or both of said conduits and be moved according to various conditions of pressure existing in said conduits, whereby pressure emanating from one conduit containing a greater pressure than the opposite conduit will be effective against a respective face of said seat means to urge the opposite face of said seat means toward oppositely disposed conduit means, liquid pressure against opposite faces of said seat means alternating same to and fro effective to open and close one or the other according to the relative pressure existing in the oppositely disposed conduits, said valve means clearing the wall of at least one conduit to permit the flow of pressure fluid from that conduit containing the greatest pressure.

Another form of the invention defined supra includes an arrangement wherein one or both of the oppositely disposed cavities are of larger inside diameter than one or both of the conduits thereby providing an annular waterway around one or both of said conduits to permit the egress of pressure fluid from one or both of said conduits according to the prevailing condition of pressure within one or the other or both of said conduits.

Another arrangement of the invention includes the use of a hollow sleeve valve member made of deformable material capable of resuming shape.

A third arrangement of the invention includes the arrangement of a casing surrounding the hollow sleeve valve member and the conduits and provided with outlet means permitting admixture of pressure fluid emanating from the oppositely disposed conduits according to predetermined relative pressure maintained within said conduits.

A fourth arrangement of the invention includes the combination of the valve member with an adjustable valve stem, said valve member being reversible on said stem to compensate for wear.

Another arrangement of the invention comprises rigid reinforcing means for the valve seat means to guide said seat means axially concentric with respect to a pressure fluid conduit.

The drawing illustrates three modes of arrangement showing the best manner and process of making and using the invention known to the inventor, as at present advised.

The several reductions to practice shown by the drawing are used for the purpose of illustration only and may be changed within the scope of the claims.

Figure 2:
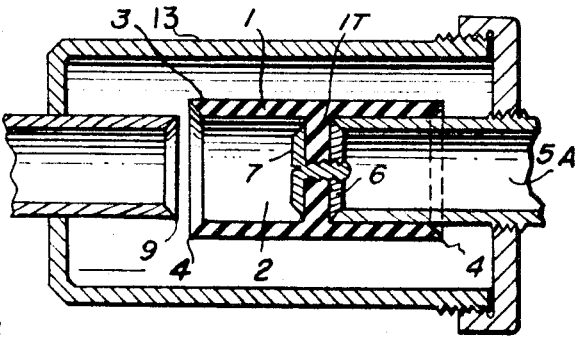

Of the drawing:

FIG. 1 is a vertical median section showing one arrangement of the invention including the utilization of a sleeve valve spaced away from a fragment of a fluid pressure conduit 8 and member 1 slidably disposed on a valve stem 5 threaded for adjustable insertion into a valve casing 13 of FIG. 2.

FIG. 2 is a median section taken thru a horizontally disposed casing arranged together with sleeve valve member 1 slidably supported by adjustable tubular stem 5A forming a pressure fluid conduit means axially aligned with oppositely disposed pressure fluid conduit 9 with the outlet side of the casing removed.

Figure 3:
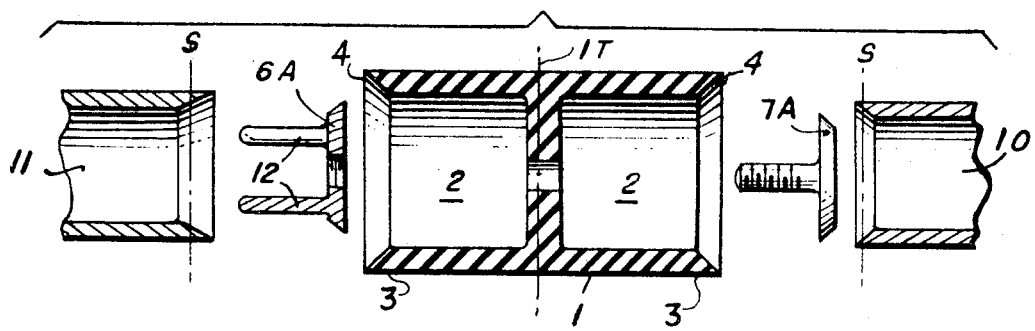

FIG. 3 is a horizontally disposed exploded elevation and illustrates another relative arrangement of sleeve valve member 1 with oppositely disposed conduits 10 and 11, guide means 6A-12 and 7A all shown in median section.

The elements and means utilized in the manner and process of making and using the invention are designated as follows:

1—Hollow sleeve valve member
1T—Valve seat means
2—Cavities
3—Skirt means
4—Beveled guide means
5—Solid threaded stem, 5A—adjustable hollow stem
5H—Wheel handle for stem 5 or 5A
6—Nut forming rigid seat bearing means for stem 5 or 5A
6A—Guided nut forming bearing means for conduit 11
7—Bolt with head forming rigid bearing means for conduit 9
7A—Bolt with head forming bearing means for conduit 10
8–9–10–11—Pressure fluid conduit means
12—Guide prongs for nut 6A
13—Casing The reduction to practice illustrated by FIG. 1 includes the utilization of hollow sleeve valve member 1 made of deformable material capable of resuming shape, formed with cavities 2—2 surrounded by skirt means 1T bisecting the hollow and closing the passage of sleeve member 1.

The hollow sleeve 1 is molded in one piece with the valve seat means 1T which is provided with an axially disposed hole therethru. A nut 6 made of rigid material is threaded to the stem of a bolt 7 extended thru the seat means 1T and securing same in operative position. Nut 6 forms a bearing for the terminal end of stem 5. The periphery of the head of bolt 7—7 provides a bearing for impinging an internally beveled seat portion provided for conduit means 8 or 9.

The arrangement as of FIGS. 1 and 2 anticipates the use of sleeve valve member 1 in a manner whereby the skirt means 3 will snugly hug respective conduit means 8 or 9 and/or stem means 5 or 5A whereby pressure emanating from pressure fluid conduit means 8, 9 or 5A will serve to expand skirt means 3 radially outward to permit egress of pressure fluid from respective conduit means according to relative condition of pressure.

Description and claim matter for the invention consists of means and manner and process of making and using alternating check valve arrangement comprising: A hollow sleeve valve member 1 made of deformable material—the hollow intersected by transverse seat means 1T dividing said hollow into oppositely disposed cylindrical cavities 2—2 surrounded by respective flexible skirt means 3, terminating in flared ends 4—4 and forming guide means surrounding adjustable supporting means formed by solid stem 5, and hollow stem means 5A, or conduits 8, 9, 10 or 11 resting against rigid bearing means 6 provided said transverse seat means 1T concomitant and forming oppositely disposed bearing surfaces for impinging respective supporting means formed by the stem means 5–5A slidably inserted into a respective recess 2—2, the terminal end of any of the conduit means 7–8–9 for pressure fluid disposed for slidable insertion into opposite cavities 2—2, the outside of skirt means 3 when disposed inside a casing 14 being subject to external pressure effectively compress said skirt means against the outside of supporting means 5–5A and/or the conduit means 7–8–9 according to the condition of pressure existing within said casing.

The form of the invention illustrated by FIGURE 2 consists of arranging a casing 13 together with the above defined and recited elements in a manner to provide oppositely deposed pressure inducing means for impinging the opposite faces of the seat means 1T–6–7, one pressure inducing means formed by a threaded valve stem for adjustable insertion into said valve casing and surmounted by actuating means for adjustment inducing pressure against a respective face of said seat means and urging the valve member in one direction, to close pressure fluid conduit means 8 or 9 forming pressure inducing means for urging said seat means 1T–6–7 toward said stem. The conduit means 8 or 9 and the stem 5 or 5A forming supporting means for holding valve member 1 in operative position for reciprocal movement to alternately urge said seat means against said stem and said fluid pressure fluid conduit according to existing conditions of pressure within the conduit and the adjusted position of the stem 5 or 5A.

Another arrangement of the elements defined and described supra, wherein two pressure fluid conduits are convergently arranged to support a valve sleeve made of deformable material capable of resuming shape and expanding under internal pressure to permit pressure fluid to pass from one or the other of the conduit means according to relative pressures existing in one or the other of said conduit means 5A–8–9–10–11, whereby pressure effective within the respective cavities 2—2 will urge the skirt means 3—3 away from the outer walls of at least one of said conduits to form clearance therebetween for the passage of pressure fluid.

It will be noted that the respective skirt 3 is spaced away from stem 5. This spacing may be followed when it is desired to increase the flow of pressure fluid from conduit means 8 and/or conduits 5A, 9, 10 or 11 by diminishing the resistance of skirt means 3 such as would accrue when respective skirt means 3 are snugly fitted around respective conduit means.

The elements and means utilized by the manner and process of making and using the invention consist of:

(1) An article of manufacture comprising a hollow sleeve valve member 1 provided with valve seat means 1T bisecting the hollow of the sleeve 1 and having oppositely disposed seating faces 6–7, cavities 2—2, disposed on opposite sides of said seat means 1T and cylindrical skirt means 3—3 projecting forwardly of the periphery of the opposite faces 6–7 of said seat means 1T and forming guide means 4—4 for surrounding convergently disposed supporting means 5–5A–8–9–10–11 and conduit means 5A–8–9–10–11 for pressure fluid.

(2) An article of manufacture of the character defined by claim 1, wherein the valve seat means 1T and the skirt means 3—3 are made of deformable material capable of resuming shape.

(3) An article of manufacture of the character defined by claim 2, wherein the respective opposite faces as at 6–7 of the seat means 1T is provided with axially disposed bearing means 6A–7A made of rigid material and surrounded by a marginal portion of said respective faces as at 6–7 of the deformable seat means 1T forming annular seat means bordering said bearing means as at 6–7–6A–7A same limiting the impingement of convergently disposed conduit and supporting means as at 5A, 8, 9, 10 and 11.

Having described my invention and the manner and process of making and using the same, the following claims are made:

1. A device of the character described comprising hollow casing means provided with opposite inlet ends and outlet means extended thru the wall of the casing means, tubular means extended convergently from the opposite ends and communicating with the hollow of the casing, the outer wall surfaces of said tubular means forming seats, sleeve valve means shiftable longitudinally of said tubular means and including annular skirt means made of deformable material capable of resuming form after being deformed, said skirt means surrounding and projecting forwardly of valve seat means disposed transversely of the hollow sleeve valve means forming closure means arranged to seat alternately against respective inner ends of either convergent seat means according to relative conditions of pressure in said inlets, the inner ends of the converging tubular seat means being spaced apart and arranged to be extended into at least one skirted end of said sleeve valve means at all times, the hollow of said casing means clearing the outer diameter of said sleeve valve means to permit passage of pressure fluid from either inlet end to said outlet means, whereby fluid pressure inside said casing means is effective to compress respective skirt means around the outside of that tubular valve seat means that is subject to a lower pressure, the opposite tubular seat means projecting positive fluid pressure inside of and expanding its associated skirt means to permit fluid flow into the hollow of said casing means.

2. A device of the nature defined in claim 1 wherein the skirt of said valve means is further adapted for snug fitting and closing around the opposite terminal ends of the converging conduits and the conduits being arranged to project within at least one skirt means at all times, whereby said sleeve valve means is carried and guided in operative alignment at all times, fluid pressure emanating from one conduit means being effective to close the oppositely disposed conduit means.

3. A device of the nature defined by claim 1 wherein guide means made of rigid material projects from at least one side of the transversely disposed valve seat means provided for the sleeve valve means.

4. A device of the nature described by claim 1, wherein the sleeve valve means is arranged to clear one tubular valve seat means when the oppositely disposed tubular valve seat means is closed.

5. An article of manufacture of the character defined by claim 1, wherein the respective opposite faces of the seat means are provided with axially disposed bearing means made of rigid material and surrounded by a marginal portion of said respective faces of the deformable seat means forming annular seat means bordering said bearing means, same limiting the impingement of convergently disposed conduit and supporting means against the annular seat means.

6. An article of manufacture comprising a cylindrical sleeve valve means provided with valve seat means transversely bisecting the inside of the sleeve valve means having seats facing away from one another, surrounded by annular skirt means made of deformable material projecting forwardly of said valve seat means, said skirt means forming expandable and contractable valve means for surrounding convergent tubular valve seat means, the bisecting valve seat means arranged for alternately seating against oppositely disposed ends of proximate terminal end portions of said tubular valve seat means.

References Cited by the Examiner
UNITED STATES PATENTS

| | | | |
|---|---|---|---|
| 3,010,477 | 11/1961 | Graham | 137—516.25 |
| 3,065,761 | 11/1962 | Peras | 137—102 |

FOREIGN PATENTS

| | | |
|---|---|---|
| 500,651 | 11/1954 | Italy. |

WILLIAM F. O'DEA, *Primary Examiner.*

ISADORE WEIL, *Examiner.*

D. ZOBKIW, *Assistant Examiner.*